(12) United States Patent
Siddiq et al.

(10) Patent No.: US 10,528,186 B2
(45) Date of Patent: Jan. 7, 2020

(54) SYSTEMS AND METHODS FOR CONTROLLING PLAYBACK OF A MEDIA ASSET USING A TOUCH SCREEN

(71) Applicant: Rovi Guides, Inc., San Carlos, CA (US)

(72) Inventors: Abubakkar Siddiq, Methuen, MA (US); Walter R. Klappert, Los Angeles, CA (US)

(73) Assignee: Rovi Guides, Inc., San Jose, CA (US)

( * ) Notice: Subject to any disclaimer, the term of this patent is extended or adjusted under 35 U.S.C. 154(b) by 235 days.

(21) Appl. No.: 15/087,444

(22) Filed: Mar. 31, 2016

(65) Prior Publication Data
US 2017/0285860 A1    Oct. 5, 2017

(51) Int. Cl.
| | |
|---|---|
| *G06F 17/00* | (2019.01) |
| *G06F 3/041* | (2006.01) |
| *G06F 3/044* | (2006.01) |
| *G06F 3/045* | (2006.01) |
| *H04N 21/472* | (2011.01) |
| *G06F 3/0484* | (2013.01) |
| *G06F 3/0488* | (2013.01) |
| *G11B 27/34* | (2006.01) |

(52) U.S. Cl.
CPC ............ *G06F 3/0418* (2013.01); *G06F 3/044* (2013.01); *G06F 3/045* (2013.01); *G06F 3/0414* (2013.01); *G06F 3/04847* (2013.01); *G06F 3/04883* (2013.01); *G11B 27/34* (2013.01); *H04N 21/47217* (2013.01); *G06F 2203/04105* (2013.01)

(58) Field of Classification Search
CPC ...... G06F 3/0418; G06F 3/0414; G06F 3/044; G06F 3/045; G06F 3/04847; G06F 3/04883; G06F 2203/04105; G06F 3/04855; G11B 27/34; H04N 21/47217
See application file for complete search history.

(56) References Cited

U.S. PATENT DOCUMENTS

| | | | | |
|---|---|---|---|---|
| 5,594,855 A | * | 1/1997 | Von Ehr, II | ........... G06T 11/203 345/442 |
| 5,757,370 A | * | 5/1998 | Amro | ................... G06F 3/04855 715/787 |

(Continued)

FOREIGN PATENT DOCUMENTS

| | | |
|---|---|---|
| CN | 1811680 | 8/2006 |

OTHER PUBLICATIONS

"How to find the slope of a line," http://web.archive.org/web/20070106063129/http://www.mathwarehouse.com/algebra/linear_equation/slope-of-a-line.php, Jan. 6, 2007 (4 pages).

*Primary Examiner* — Cesar B Paula
*Assistant Examiner* — James H. Blackwell
(74) *Attorney, Agent, or Firm* — Haley Guiliano LLP

(57) ABSTRACT

Systems and methods are described herein for controlling playback of a media asset using a touch screen. In some embodiments, a media guidance application may control media playback based on touch screen input positions that are stored before the user removes his finger from the touch screen. In some embodiments, the media guidance application may distinguish between intended touch screen inputs and jitter by analyzing the time it takes to perform a touch screen input, the speed/acceleration of an input, or the orientation of an input.

22 Claims, 9 Drawing Sheets

(56) References Cited

U.S. PATENT DOCUMENTS

| | | | |
|---|---|---|---|
| 6,707,449 B2* | 3/2004 | Hinckley | C08F 236/12 345/156 |
| 6,744,967 B2 | 6/2004 | Kaminski et al. | |
| 6,847,778 B1 | 1/2005 | Vallone et al. | |
| 7,421,656 B2* | 9/2008 | Fong | G06F 3/0219 715/716 |
| 7,551,832 B2 | 6/2009 | Plourde, Jr. | |
| 7,962,942 B1 | 6/2011 | Craner | |
| 8,059,101 B2 | 11/2011 | Westerman | |
| 8,436,827 B1* | 5/2013 | Zhai | G06F 3/0416 178/18.01 |
| 8,984,431 B2* | 3/2015 | Chaudhri | G06F 3/0481 715/772 |
| 9,143,589 B2* | 9/2015 | Lee | H04M 1/0266 |
| 9,235,289 B2* | 1/2016 | Santos | G06F 3/0416 |
| 9,292,111 B2* | 3/2016 | Westerman | G06F 3/038 |
| 9,547,437 B2* | 1/2017 | Fino | G06F 17/30849 |
| 9,710,154 B2* | 7/2017 | Shafi | G06F 3/04883 |
| 2002/0030667 A1* | 3/2002 | Hinckley | C08F 236/12 345/173 |
| 2007/0220444 A1 | 9/2007 | Sunday | |
| 2007/0229466 A1 | 10/2007 | Peng | |
| 2008/0036743 A1* | 2/2008 | Westerman | G06F 3/038 345/173 |
| 2008/0055272 A1* | 3/2008 | Anzures | G06F 1/1626 345/173 |
| 2008/0165141 A1 | 7/2008 | Christie | |
| 2008/0297484 A1 | 12/2008 | Park et al. | |
| 2010/0231534 A1* | 9/2010 | Chaudhri | G06F 3/0481 345/173 |
| 2010/0231536 A1 | 9/2010 | Chaudhri | |
| 2011/0037727 A1 | 2/2011 | Lee | |
| 2011/0074694 A1* | 3/2011 | Rapp | G06F 3/04845 345/173 |
| 2011/0191679 A1* | 8/2011 | Lin | G06F 17/30781 715/716 |
| 2012/0023462 A1 | 1/2012 | Rosing et al. | |
| 2012/0056818 A1* | 3/2012 | Shafi | G06F 3/04883 345/173 |
| 2012/0240074 A1* | 9/2012 | Migos | G06F 3/0483 715/776 |
| 2012/0308204 A1* | 12/2012 | Hwang | G06F 3/04847 386/241 |
| 2013/0002600 A1* | 1/2013 | McCracken | G06F 3/044 345/174 |
| 2013/0194200 A1* | 8/2013 | Zanone | G06F 3/0418 345/173 |
| 2013/0290892 A1* | 10/2013 | Basapur | G06F 17/30064 715/772 |
| 2014/0028609 A1* | 1/2014 | Santos | G06F 3/044 345/174 |
| 2014/0150026 A1* | 5/2014 | Mountain | G06F 3/0485 725/52 |
| 2014/0282224 A1* | 9/2014 | Pedley | G06F 3/017 715/784 |
| 2015/0058723 A1* | 2/2015 | Cieplinski | G06F 3/04855 715/702 |
| 2015/0242942 A1* | 8/2015 | Viswanath | G06Q 20/40145 705/27.2 |
| 2016/0077734 A1* | 3/2016 | Buxton | G06F 3/04842 715/773 |
| 2016/0139794 A1* | 5/2016 | Hammendorp | G06F 3/04883 715/716 |
| 2016/0357281 A1* | 12/2016 | Fleizach | H04N 3/155 |
| 2017/0285861 A1 | 10/2017 | Siddiq | |

\* cited by examiner

800

```
800 ...
801 Initialization Subroutine
802 ...
803 //Routine to control playback of a media asset:
804
805  Detect a first transition event of contact on a touch screen
806  Retrieve timestamp associated with contact a first position = t1
807  Retrieve timestamp associated with contact a second position = t2
808  Retrieve time duration of contact at second position = t3
809  if (t3 – t2) > T_threshold
810      store indication of second position to memory = A
811  Detect a second transition event of contact on the touch screen
812  Detect an end event, wherein contact is removed from the touch screen
813  Retrieve A
814  Execute Subroutine to adjust playback of the media asset based on A
815 ...
816 Termination Subroutine
817 ...
```

902 — Generate for display a media asset for playback and a progress bar associated with the media asset

904 — Receive a first indication of contact on a touch screen at a first position, the first indication including at least a set of position coordinates corresponding to the first position

906 — Subsequent to receiving the first indication, receive a second indication of contact on the touch screen at a second position that is different than the first position, the second indication including at least a set of position coordinates corresponding to the second position

908 — Calculate, based on the position coordinates corresponding to the first position and the position coordinates corresponding to the second position, a direction of movement from the first position to the second position

910 — Detect an orientation of the progress bar on the generated display

912 — Separate the calculated direction of movement into a component that is parallel to the orientation of the progress bar and a component that is perpendicular to the orientation of the progress bar

914 — Control playback of the media asset to a position in the media asset based on the component of the direction of movement that is parallel to the orientation of the progress bar

```
1000 ...
1001 Initialization Subroutine
1002 ...
1003 //Routine to reduce jitter for touch screen input
1004
1005   receive indication of contact at first position = (x1, y1)
1006   receive indication of contact at second position = (x2, y2)
1007
1008   //calculate magnitude and direction of movement
1009   sqrt [(y2 − y1)^2 + (x2 − x1)^2] = magnitude1
1010   arctan [(y2 − y1)/(x2 − x1)] = angle1
1011
1012   //Determine orientation of progress bar
1013   Retrieve start position of progress bar = (x3, y3)
1014   Retrieve end position of progress bar = (x4, y4)
1015   arctan [(y4 − y3)/(x4 − x3)] = angle2
1016
1017   //Calculate components of direction of movement
1018   magnitude1*cos(angle2) = X
1019   magnitude1*sin(angle2) = Y
1020
1021   Execute Subroutine to control playback of the media asset based on X
1022 ...
1023 Termination Subroutine
1024 ...
```

FIG. 10

SYSTEMS AND METHODS FOR
CONTROLLING PLAYBACK OF A MEDIA
ASSET USING A TOUCH SCREEN

BACKGROUND

Consumers use a variety of user devices to consume media content, including, for example, personal computers, tablets, and smart phones, among others. Many of these user devices include touch screens and methods of navigating through media content using touch controls. For example, some applications may receive touch, swipe, or a combination of touch inputs to play, pause, fast forward, rewind, and jump through media content. However, touch controls can be inaccurate and often result in "jitter," wherein the touch screen registers unintended user inputs. For example, when a user swipes a finger across the screen, the touch screen may register unintended motions when the user removes his finger from the screen. As such, the user may not be able to accurately navigate as desired through the media asset.

SUMMARY

Accordingly, systems and methods are described herein for controlling playback of a media asset using a touch screen and reducing jitter of touch screen inputs. In some embodiments, a media guidance application may control media playback based on touch screen input positions that are stored before the user removes his finger from the touch screen. In some embodiments, the media guidance application may distinguish between intended touch screen inputs and jitter by analyzing the time it takes to perform a touch screen input, the speed/acceleration of an input, or the orientation of an input.

As an illustrative example, media guidance applications may provide methods for controlling media asset playback based on a variety of touch screen inputs, including touches, taps, long presses, swipes, gestures, or other such touch screen inputs or combination of inputs. For instance, a forward swipe (from left to right) on the screen may cause playback to fast forward an amount, while a reverse swipe (from right to left) may cause playback to reverse an amount. The amount may be a predetermined amount (such as a certain number of frame(s) or seconds) or by an amount determined by the length of the swipe. In this manner, the user may fast forward by a greater amount by performing a longer swipe. The amount may also be determined by a pressure of contact on the touch screen. For example, a swipe gesture performed with a light touch on the touch screen may cause the media to fast forward or rewind by one amount of time (e.g., by intervals of one second), while a swipe gesture performed with a relatively heavy touch on the touch screen may cause the media to fast forward or rewind by another amount of time (e.g., by intervals of ten seconds). The amount that the media asset fast forwards or rewinds may be directly proportional to detected changes in the capacitance and/or resistance of elements of the touch screen. In some embodiments, the user may tap on a progress bar to jump to a position in the media asset corresponding to the tapped position on the progress bar.

Any of the touch screen inputs described herein may result in "jitter." As used herein, "jitter" refers to any registered touch screen inputs resulting from an unintentional user inputs. For example, jitter often occurs when a user removes contact (such as a finger) from the touch screen. Due to the sensitivity of the touch screen, and in some cases the wide area of contact on the touch screen (such as users with large fingers), the touch screen may register one or more inputs while the user is removing the contact.

In some embodiments, the touch screen, the touch screen user interface (UI), and/or an application program interface (API) associated with the touch screen, may register touch screen inputs via "events." As used herein, the term "event" or "touch screen event" or "input event" refers to any indication that indicates a user input or that is generated or received in response to a user input. The event indications may include any descriptive data for the user input, including, for instance, position, timestamp, time duration, orientation, magnitude/length, direction, or any combination of the above.

In some embodiments, touch screens generate a "start", "transition," and "end" events in conjunction with a swipe gesture. The start event typically indicates a position and/or a time when contact is first detected on the touch screen. For instance, the touch screen may be a capacitive-style touch screen or a resistive-style touch screen that detects changes in capacitance and/or resistance at a contact point when the user contacts the touch screen. In response to detecting these changes in capacitance and/or resistance, the touch screen, touch screen interface, or touch screen API may generate the start event to represent a position and/or time that the user first touched the touch screen.

The transition event typically indicates a movement from a first position to a second position, and may include indications of the first position, the second position, and/or timestamps associated with the start and end of the movement. For example, the user may swipe a finger across the touch screen without removing contact from the screen. The touch screen, touch screen UI, or touch screen API may detect the movement of the contact, for example by detecting changes in position of the contact point over time. As described above, the contact point may be determined by detecting changes in capacitance and/or resistance on the touch screen. The touch screen, touch screen interface, and/or touch screen API may detect the end of a swipe by tracking a speed and/or acceleration of the movement. For example, the user may swipe the finger a certain distance and slow or stop the swipe at the desired position. The media guidance application may track the speed and/or acceleration of the swipe and detect when it falls below a certain threshold. In response to detecting the speed and/or acceleration of the swipe falling below a threshold value, the media guidance application may generate the transition event.

The end event typically indicates the moment that contact is no longer detected on the touch screen and may include a position and/or a timestamp associated with the time that contact was removed from the touch screen. For example, when the user removes contact from the touch screen, the capacitance and/or resistance at the previous point of contact may return to a baseline value or fall below a baseline threshold. In such cases, the media guidance application may detect the removal of contact from the screen and in response, generate an end event. Although some of the embodiments described herein are described in relation to the start, transition, and end events, it will be understood by those of skill in the art that such descriptions are provided for illustrative purposes only, and that the systems and methods described herein can be extended to other events and touch screen interfaces as appropriate.

In some embodiments, the touch screen, the touch screen user interface (UI), and/or an application program interface (API) associated with the touch screen may provide periodic updates to a position and/or time value during the user input. Thus, instead of tracking start, transition, and end events associated with the input, the media guidance application may simply store value updates over the course of the user input.

In some aspects, a media guidance application may control playback of a media asset by detecting contact on a touch screen at a first position, detecting a first transition event of the contact from the first position to a second position on the touch screen, wherein the contact is not removed from the touch screen during the first transition event, and detecting, subsequent to the first transition event, the contact at the second position for a period of time. As discussed above, the transition event may include any suitable information describing the user input, including, for example, start position, end position, and/or timestamps associated with the start position and end position. In response to detecting the contact at the second position for the period of time, the media guidance application may store to memory an indication of the second position. This second position represents a position where the user may have paused in a swipe feature, and may represent the desired position of the user input. However, since the user has not removed contact from the touch screen, the touch screen may register jitter after this desired position. To this end, the media guidance application may detect, subsequent to the first transition event, a second transition event of the contact from the second position to a third position on the touch screen. This second transition event may represent jitter, wherein the touch screen registers unintended movement. The media guidance application may then detect, subsequent to the second transition event, an end event wherein the contact is removed from the touch screen at the third position. In response to detecting the second transition event, the media guidance application may retrieve the indication of the second position from memory and adjust playback of the media asset to a position in the media asset corresponding to the second position. In this manner, the media guidance application may reduce jitter by adjusting playback based on a position where the user input was paused, instead of the last position where contact on the touch screen was detected, thereby increasing the accuracy of playback controls on the touch screen.

In some embodiments, the first transition event may comprise a swipe gesture on a progress bar of the media asset. In some embodiments, the second transition event may comprise jitter from the second position to the third position while removing the contact from touch screen. The media guidance application may determine that the third position is different than the second position, and may adjust playback in response to this determination.

In some embodiments, the media guidance application may, in response to detecting the contact on the touch screen at the first position, generate for display an image of the media asset corresponding to the first position on the touch screen. For example, the media guidance application may generate a picture-in-picture screenshot of the media asset corresponding to a current position or a position associated with the position of the contact on the touch screen. As an illustrative example, if a media asset is paused at time 4:37, then the media guidance application may generate a small frame above the progress bar that depicts a screenshot at time 4:37. If the media asset is paused at 4:37, but the user touches a position on the progress bar corresponding to 8:56, then the media guidance application may generate the frame with a screenshot that depicts the media asset at time 8:56. In some embodiments, the picture-in-picture display may be accompanied by either a timestamp and/or a frame number corresponding to the displayed screenshot.

In some embodiments, the media guidance application may adjust playback of the media asset to the position in the media asset corresponding to the second position by determining a time stamp associated with the second position on the touch screen. In some embodiments, the media guidance application may adjust playback of the media asset by a certain amount based on a length of the first transition event.

In some embodiments, the media guidance application may wait to detect contact for a threshold amount of time before registering the touch screen input. In some embodiments, the media guidance application may detect the first transition event within a portion of the touch screen and adjust playback by a predetermined amount that is associated with the portion of the touch screen. For instance, the media guidance may generate a display on the touch screen, wherein gestures in certain portions of the touch screen result in adjusting playback by predetermined amounts. For example, while the media asset is paused, then a swipe forward in an area above a displayed progress bar may fast forward the playback by a predetermined number of seconds. A swipe forward in an area below the displayed progress bar may fast forward the playback by a predetermined number of minutes. In this manner, different areas of the screen may be utilized to adjust playback by larger or smaller quantities of time.

In some aspects, the media guidance application may distinguish between jitter and intended user inputs based on orientation, speed, and/or acceleration of the touch screen input. The media guidance application may generate for display a media asset for playback and a progress bar associated with the media asset. The progress bar may have a particular orientation, such as parallel to a bottom edge of the generated display. While the systems and methods described herein are described with respect to a horizontal progress bar, it will be understood that the systems and methods described herein may be utilized with a progress bar in any suitable orientation, such as vertical or rotated by a particular angle compared to a edge of the display.

In some embodiments, the media guidance application may receive a first indication of contact on a touch screen at a first position, the first indication including at least a set of position coordinates corresponding to the first position. These position coordinates may comprise any suitable data for describing the position, such as x and y coordinates, polar coordinates (such as magnitude and direction/angle), or 3D coordinates. Subsequent to receiving the first indication, the media guidance application may receive a second indication of contact on the touch screen at a second position that is different than the first position, the second indication including at least a set of position coordinates corresponding to the second position. The media guidance application may calculate, based on the position coordinates corresponding to the first position and the position coordinates corresponding to the second position, a direction of movement from the first position to the second position. This direction of movement may include, for example, a slope, an angle, and/or a magnitude associated with the movement.

In some embodiments, the media guidance application may detect an orientation of the progress bar on the generated display. The orientation of the progress bar may be previously known, such as in embodiments where the progress bar is horizontal and parallel to a bottom edge of the display. In some embodiments, the orientation of the progress bar may be calculated, for example from a known start and end position of the progress bar. The orientation may include, for instance, a direction, a slope, an angle, and/or a magnitude/length of the progress bar.

The media guidance application may separate the calculated direction of movement into a component that is parallel to the orientation of the progress bar and a component that is perpendicular to the orientation of the progress bar. For example, the parallel component and the perpendicular component may have magnitudes that, when combined using the Pythagorean theorem, equal the overall magnitude of the calculated direction of motion. In this manner, the media guidance application may ignore inputs that are perpendicular to the progress bar and register only inputs that are parallel to the progress bar.

The media guidance application may control playback of the media asset to a position in the media asset based on the component of the direction of movement that is parallel to the orientation of the progress bar. For instance, the media guidance application may adjust playback of the media asset a certain amount based on the magnitude of the parallel component. In some embodiments, the media guidance application may adjust playback a certain amount based on the direction of the parallel component. For example, the media guidance application may adjust the playback forward by 10 seconds for a forward swipe, regardless of the magnitude of the swipe.

In some embodiments, the media guidance application may control playback of the media asset by maintaining a pause point and not adjusting the playback of the media asset based on the touch input. For example, the media guidance application may determine that the input is jitter and thus not an intended user input. In some embodiments, the media guidance application may determine whether a magnitude of the perpendicular component is greater than a threshold magnitude. For instance, this may indicate that the user input is mostly vertical, while the progress bar may be horizontal. This may indicate the user swipe was not intended to be a horizontal swipe to control playback of the media asset. In some embodiments, the media guidance application may determine whether the perpendicular component is greater than the parallel component. Again, this may indicate that the user swipe is substantially different than the orientation of the progress bar. In some embodiments, the media guidance application may determine that an overall duration of the touch input is less than a threshold time. This may indicate that the touch input was unintentional. For example, the touch input may be less than a typical tap or swipe, or the touch input may be less than is physically possible for a human being to perform on the touch screen. Thus, the media guidance application may determine that the touch input is jitter based on the overall duration of the input.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 8 depicts illustrative pseudocode for adjusting playback of a media asset in accordance with some embodiments of the disclosure;

FIG. 9 is a flowchart of illustrative steps for reducing jitter of a touch screen input in accordance with some embodiments of the disclosure;

FIG. 10 depicts illustrative pseudocode for reducing jitter of a touch screen input in accordance with some embodiments of the disclosure.

DETAILED DESCRIPTION OF THE DRAWINGS

Figure 1:
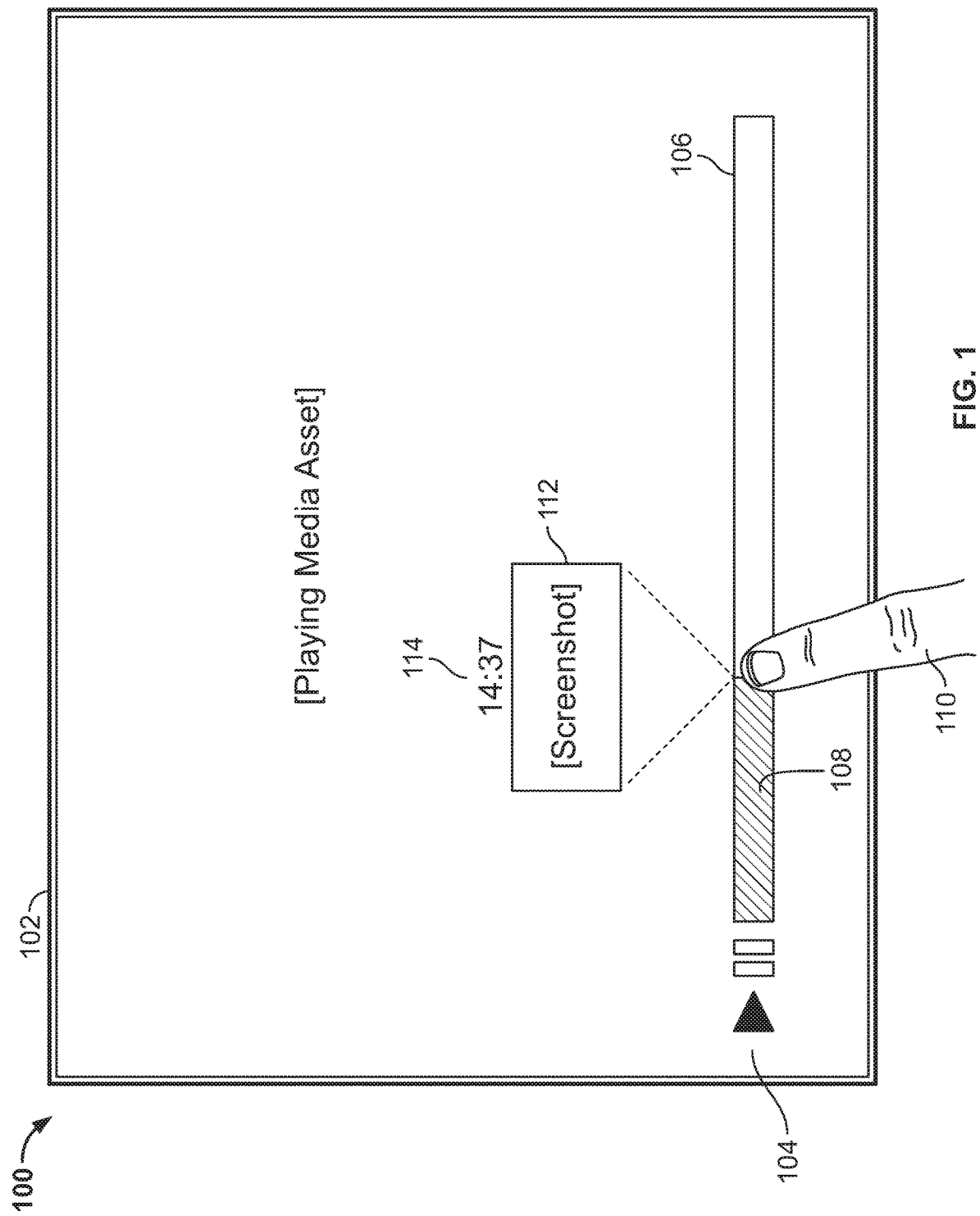
FIG. 1 shows an illustrative media playback screen in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, web-sites, and any other type of guidance data that is helpful for a user to navigate among and locate desired content selections.

FIG. 1 shows an illustrative media playback screen 100 in accordance with some embodiments of the disclosure. Media playback screen includes display 102, playback controls 104, progress bar 106, progress indicator 108, finger 110, frame 112, and timestamp 114. It will be understood that the media playback screen 100 is provided for illustrative purposes only, and that other configurations and combinations of elements may be contemplated as will be understood by those of skill in the art. For instance, the placement of the playback controls 104, progress bar 106, frame 112, and timestamp 114 may be arranged in any suitable location and orientation on the display 102. It will be further understood that frame 112 and timestamp 114 are optional and displayed for illustrative purposes only. In some embodiments, frame 112 and timestamp 114 may not be displayed at all. Furthermore, although only a "play" and a "pause" control are depicted as playback controls 104, other controls may be included as will be understood by those of skill in the art.

In the illustrative example depicted in FIG. 1, a media asset is playing on display 102 while the user is touching the progress bar 106. In some embodiments, contacting the progress bar, either by a temporary tap, long press, or a swipe, results in pausing the media asset in response to the input. In some embodiments, the media asset may continue playback while the user contacts the progress bar. In the illustrative example depicted in FIG. 1, the frame 112 includes a screenshot of a position in the media asset corresponding to the position on the progress bar contacted by finger 110. The timestamp 114 indicates the time of the position of the progress bar. In some embodiments, the progress indicator 108 may highlight the portion of the progress bar 106 prior to the point contacted by finger 110. In some embodiments, the progress indicator 108 may indicate the portion of the media asset that has currently been consumed. For instance, the contact point of finger 110 may be ahead of the position in the media asset that has been consumed. In these embodiments, the progress indicator 108 may highlight the portion of the progress bar 106 that has been consumed, and a portion of the progress bar 106 may remain unhighlighted to indicate the portion of the media asset that has not yet been consumed.

The user may fast forward or rewind through the media asset by performing swipe gestures either directly on the touch screen or anywhere on the touch screen. The swipe gesture may generate a start, transition, and end event corresponding to the moment when the touch screen first detects contact, detects a movement of the content, and detects removal of the contact from the screen. Each of these events may include, for example, an indication of the position on the touch screen corresponding to the event. Touch-based controls for controlling media playback typically utilize a position corresponding to the end event, that is corresponding to the position where contact was last detected on the touch screen, to control playback of the media asset. However, this position may include jitter, due to the inaccuracy of touch screens. As such, some embodiments of the systems and methods described herein ignore the position associated with the end event and instead utilize a position associated with a transition event and/or a position associated with a point where the user "paused" the swipe in order to control playback of the media asset.

In some embodiments, the media guidance application may determine jitter based on an orientation of the swipe motion compared to an orientation of a progress bar and/or an edge of a screen, window, or display. For instance, if a swipe gesture is in a substantially different direction as the progress bar, then the media guidance application may determine that the swipe gesture was not intended to be a playback navigation control and may not change playback of the media asset based on the swipe gesture.

Figure 2:
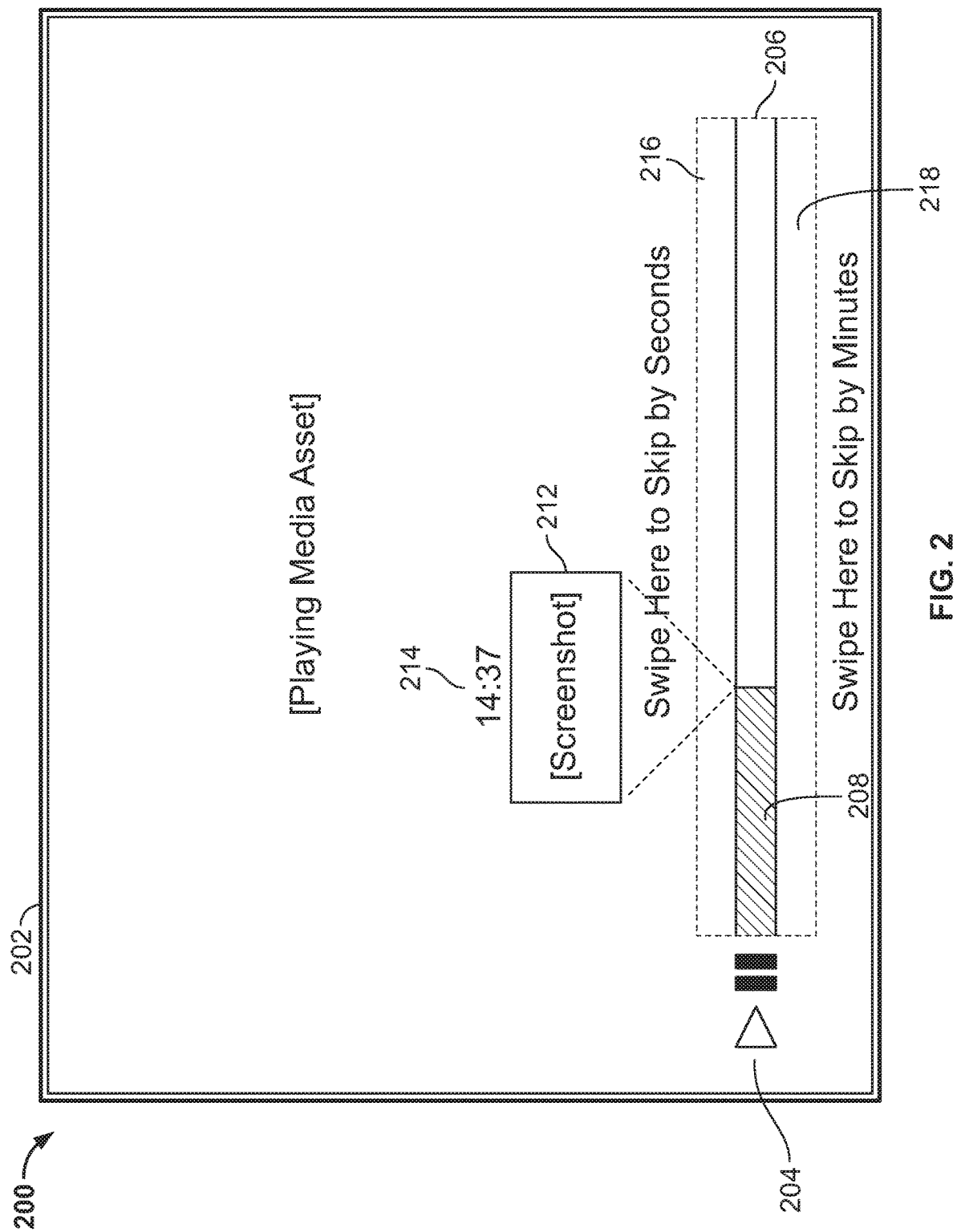
FIG. 2 shows another illustrative example of a media playback screen in accordance with some embodiments of the disclosure.

FIG. 2 shows an illustrative example of a media playback screen 200 in accordance with some embodiments of the disclosure. Media playback screen 200 includes display 202, playback controls 204, progress bar 206, progress indicator 208, frame 212, timestamp 214, first control area 216, and second control area 218. Display 202, playback controls 204, progress bar 206, progress indicator 208, frame 212, and timestamp 214 may be substantially similar to their corresponding elements depicted in FIG. 1 and discussed above.

Media playback screen 200 may be generated for display in response to several user inputs. In some embodiments, media playback screen 200 may be generated for display in response to a user touch input on the display 202, such as the input discussed above in relation to FIG. 1. In such embodiments, the media playback screen 200 may be generated for display only while the finger 110 maintains contact with the progress bar 206 and/or display 202, or may remain displayed even after the finger 110 is removed from the screen (as depicted in FIG. 2). In some embodiments, media playback screen 200 may be generated for display in response to a user input to pause the media asset. This pause input may be received, for instance, by tapping the "pause" icon included in playback controls 204.

In some embodiments, the media playback screen 200 may be generated for display as a "navigation mode" in which the entire touchscreen may be used to control playback of the media asset, rather than merely touch inputs registered on the progress bar. For instance, the touch screen may be divided into various areas usable to execute particular playback functions and durations. In the illustrative example depicted in FIG. 2, the display 202 includes first control area 216 above the progress bar 206 and second control area 218 below the progress bar 206. It will be understood that these areas and arrangement of elements are provided for illustrative purposes only, and that other arrangements may be contemplated by those of skill in the art. The first control areas 216 and 218 may be configured to receive user touch inputs and to control the playback of the media asset by different amounts. For example, a 1-inch long swipe in first control area 216 may result in executing a fast forward operation of 10 seconds, while a similar 1-inch long swipe in second control area 218 may result in executing a fast forward operation of 10 minutes. In some embodiments, the length of the swipe gesture does not affect the amount of the fast forward or rewind operation. For instance, a 1-inch long swipe backwards in the first control area 216 may result in executing a rewind operation of 1 second, while a 6-inch long swipe backwards also results in the execution of a rewind operation of 1 second. This may facilitate the accurate navigation through the media asset by allowing frame-by-frame, second-by-second, or minute-by-minute navigation through the media asset using the touch screen display. In some embodiments, the amount that the playback of the media asset is adjusted may also be determined by a pressure of contact on the touch screen. For example, a swipe gesture performed with a light touch on the touch screen may cause the media to fast forward or rewind by one amount of time (e.g., by intervals of one second), while a swipe gesture performed with a relatively heavy touch n the touch screen may cause the media to fast forward or rewind by another amount of time (e.g., by intervals of ten seconds). The amount that the media asset fast forwards or rewinds may be directly proportional to detected changes in the capacitance and/or resistance of elements of the touch screen.

Figure 3:
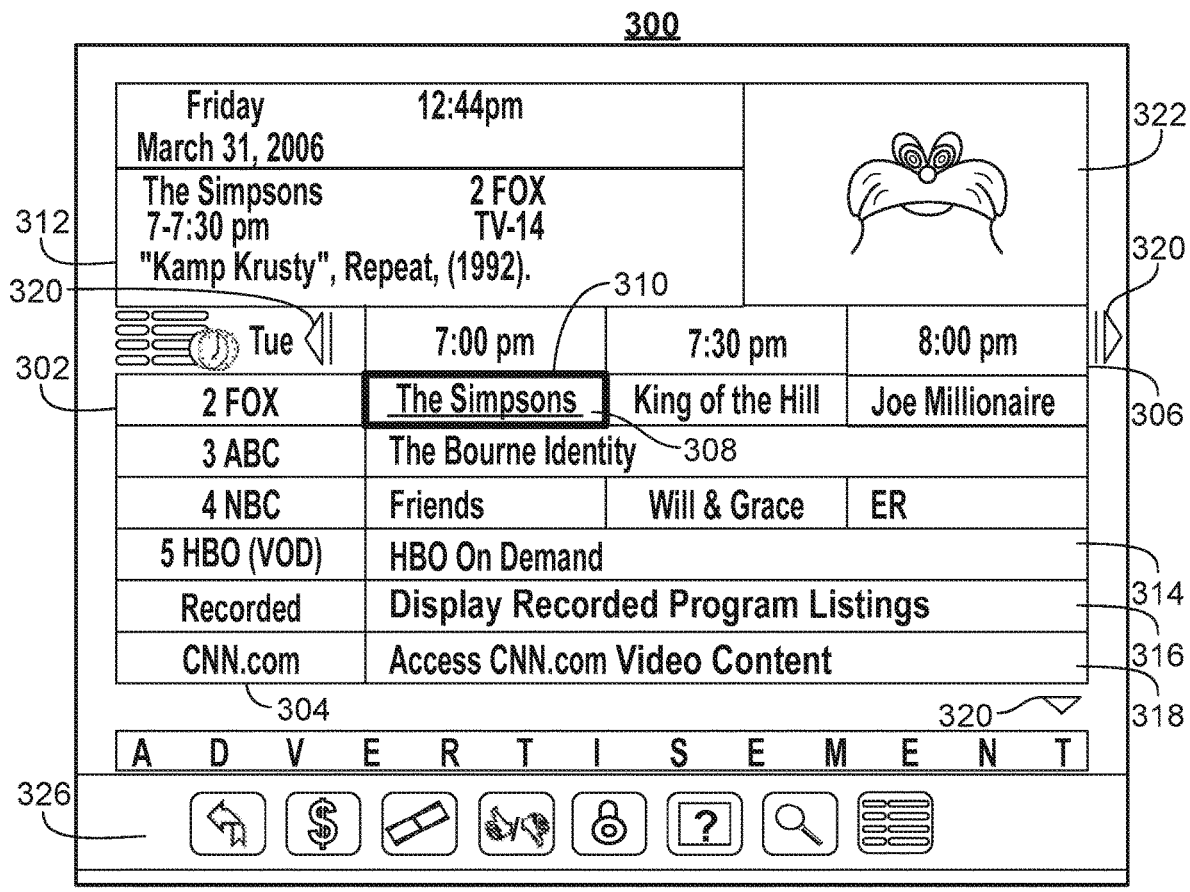
FIG. 3 shows an illustrative example of a display screen for use in accessing media content in accordance with some embodiments of the disclosure.
Figure 4:
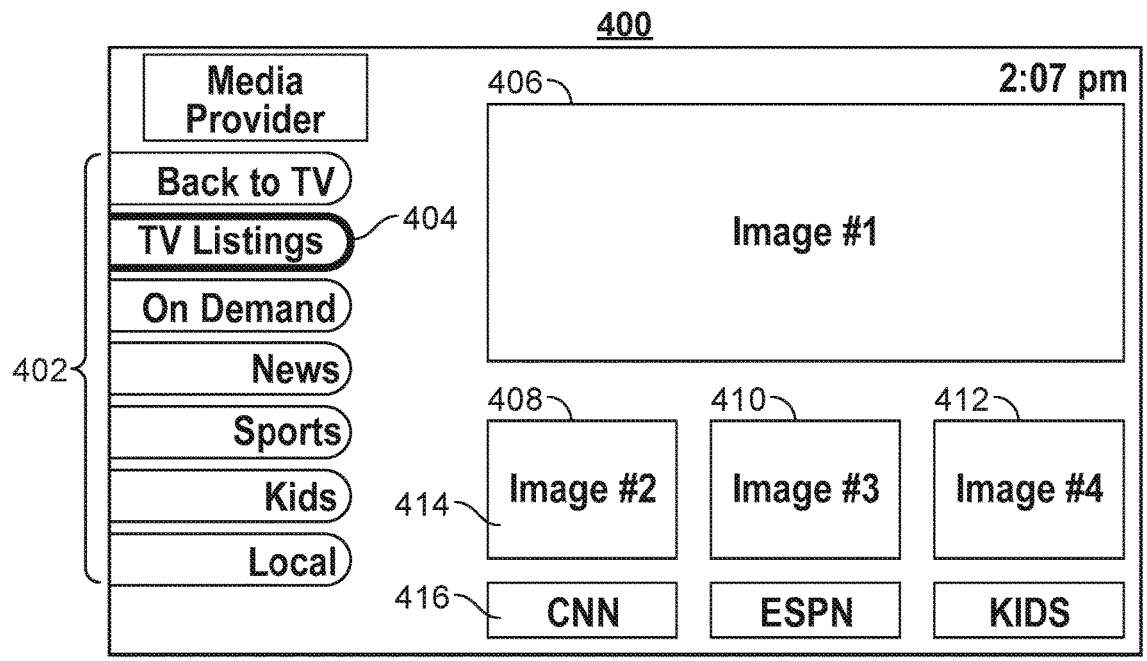
FIG. 4 shows another illustrative example of a display screen used to access media content in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Nov. 12, 2009, which is hereby incorporated by reference herein in its entirety.

Figure 5:
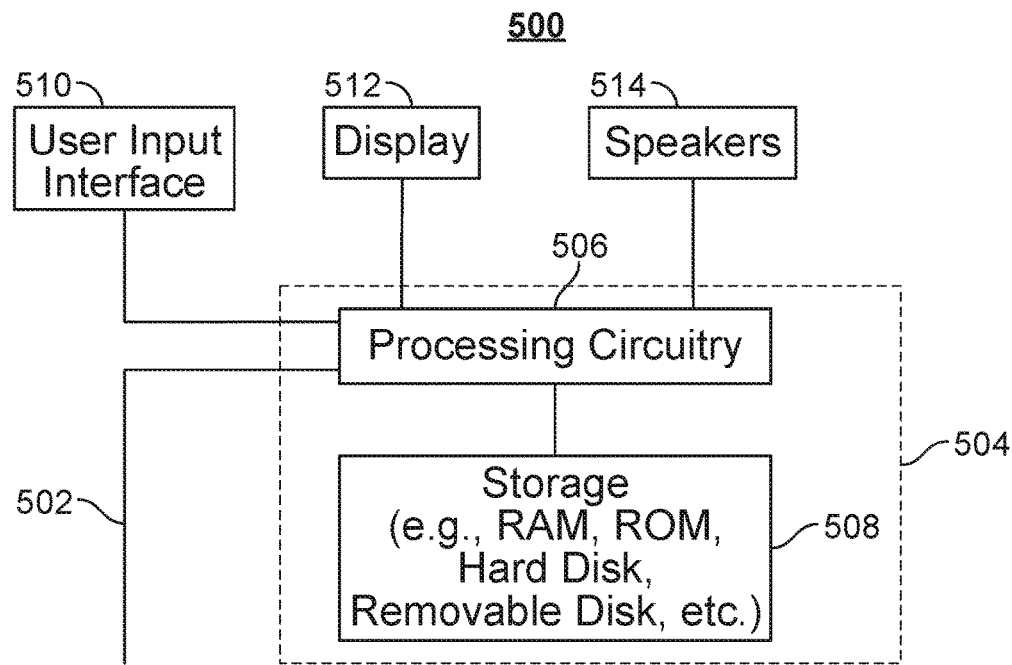
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
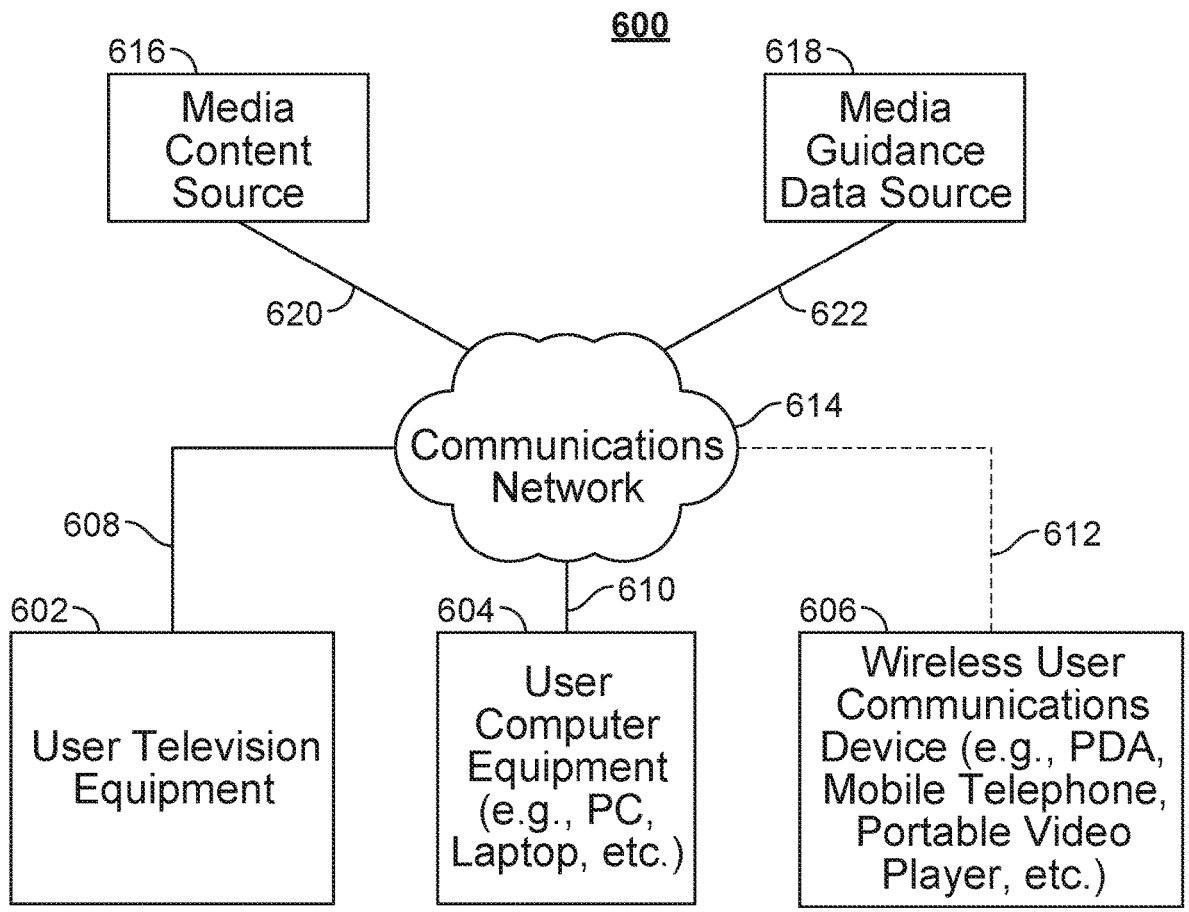
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
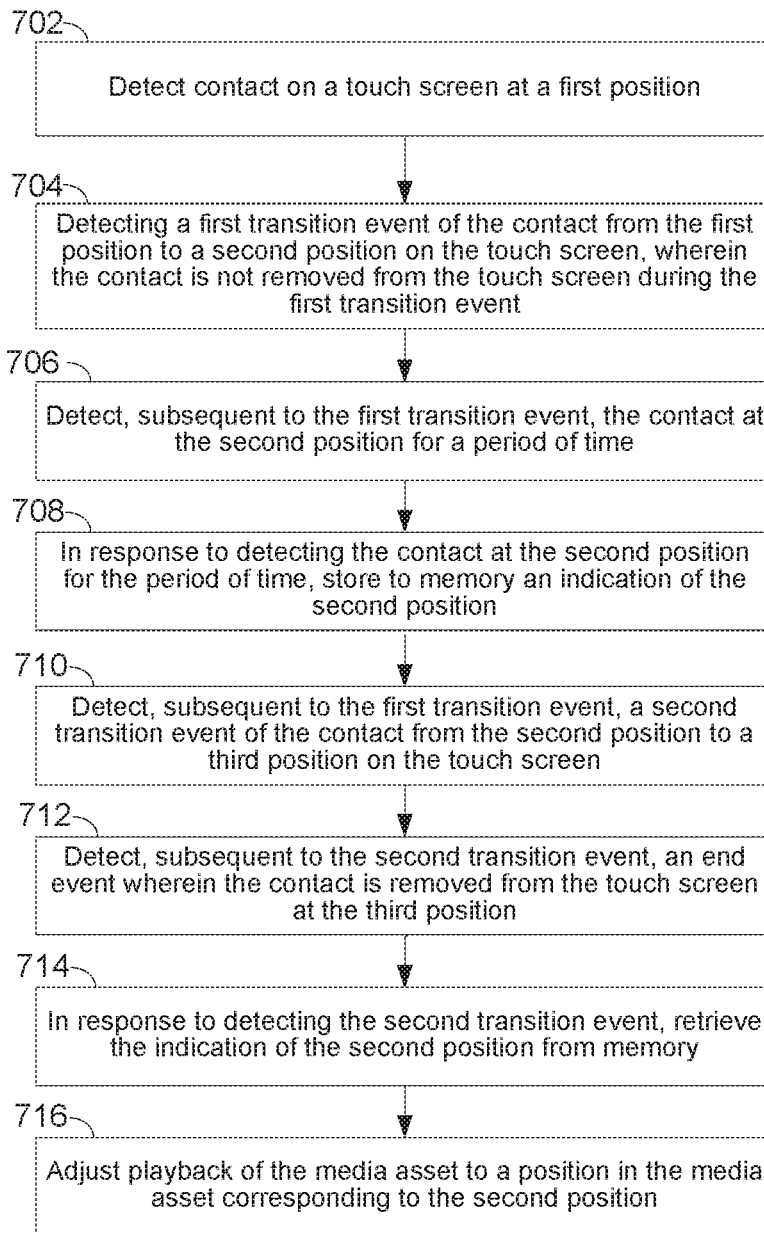
FIG. 7 is a flowchart of illustrative steps for adjusting playback of a media asset in accordance with some embodiments of the disclosure.

FIG. 7 is a flowchart 700 of illustrative steps for adjusting playback of a media asset in accordance with some embodiments of the disclosure. It should be noted that process 700, or any step thereof, could occur on, or be provided by, any of the devices shown in FIGS. 5-6. For example, process 700 may be executed by control circuitry 504 (FIG. 5) as instructed by the media guidance application (e.g., as implemented on any of the devices shown and described in FIG. 6).

At step 702, the media guidance application may detect (e.g., using user input interface 510 and/or control circuitry 504), contact on a touch screen at a first position. The media guidance application may detect contact in any suitable manner. For instance, the media guidance application may receive a start event from a touch screen, touch screen interface, and/or a touch screen API. The start event may include, for example, an indication of a position and/or a timestamp associated with the contact point on the touch screen. The media guidance application may detect a first contact point by, for example, detecting changes in the capacitance and/or resistance of the touch screen at a certain point. For example, as depicted in FIG. 1, the user may touch screen 102 with finger 110, and the screen 102 may register a change in capacitance and/or resistance at the contact point. In response to detecting these changes in capacitance and/or resistance, the media guidance application may generate a start event. The media guidance application may further detect a movement of the contact point by tracking the capacitance and/or resistance of the touch screen as the contact point is moved across the touch screen (e.g., a swipe of the finger 110 in FIG. 1). In some embodiments, the media guidance application detects movement by tracking position coordinates of the contact point as it changes the capacitance and/or resistance of the touch screen as it is moved across the touch screen. The media guidance application may take a first derivative of the position coordinates to determine a speed of the movement, and a second derivative of the position coordinates to determine an acceleration of the movement. For instance, given two consecutive position coordinates $(x_1, y_1)$ and $(x_2, y_2)$ separated by two timestamps $t_1$ and $t_2$, the speed of movement may be determined by taking the square root of $((x_1-x_2)^2+(y_1-y_2)^2)$ and dividing the result by ($t_2-t_1$). The acceleration of movement can be determined by taking the difference of two consecutive different speed determinations and dividing by the time difference between the two speed determinations. When the media guidance application detects that the speed and/or acceleration of the movement falls below a threshold speed or threshold acceleration, then the media guidance application may generate a transition event. Finally, when the media guidance application detects the removal of contact from the touch screen (e.g., removal of the finger 110 in FIG. 1 causes the capacitance and/or resistance to return to a baseline value), then the media guidance application may generate an end event.

At step 704, the media guidance application may detect (e.g., using user input interface 510 and/or control circuitry 504) a first transition event for the contact from the first position to a second position on the touch screen, wherein the contact is not removed from the touch screen during the first transition event. For example, the first transition event may represent a swipe gesture by a user from the first position to the second position on the touch screen. The transition event may be an indication of any suitable information about the swipe gesture, including, but not limited to, a start position of the swipe, an end position of the swipe, timestamps associated with the start and end of the swipe, a time duration of the swipe, a length of the swipe, and/or a direction/orientation of the swipe.

At step 706, the media guidance application may detect (e.g., using user input interface 510 and/or control circuitry 504), subsequent to the first transition event, the contact at the second position for a period of time. The period of time may represent a pause of the swipe by the user at the second position. In some embodiments, the contact need not remain at exactly the second position (that is, at the exact x/y coordinates of the second position). Instead, the contact may remain in a threshold area around the second position for the period of time.

At step 708, the media guidance application may, in response to detecting the contact at the second position for the period of time, store to memory (such as storage 508) an indication of the second position. For example, the media guidance application may store x/y coordinates associated with the second position to memory.

At step 710, the media guidance application may detect (e.g., using user input interface 510 and/or control circuitry 504), subsequent to the first transition event, a second transition event of the contact from the second position to a third position on the touch screen. The method of detection in step 710 may be substantially similar to step 704. In some embodiments, the movement from the second position to the third position may comprise jitter, wherein the user did not intend to input a movement from the second position to the third position. At 712, the media guidance application may detect (e.g., using user input interface 510 and/or control circuitry 504), subsequent to the second transition event, an end event wherein the contact is removed from the touch screen at the third position. The end event may include an indication of the final position of the contact and/or a timestamp associated with the final position.

At step 714, the media guidance application may retrieve (e.g., using control circuitry 504), in response to detecting the second transition event, the indication of the second position from memory. At 716, the media guidance application may adjust (e.g., using control circuitry 504) playback of the media asset to a position in the media asset corresponding to the second position. As an illustrative example, the second position may correspond to a position on a progress bar for a media asset, and the media guidance application may adjust playback of the media asset to a position in the media asset corresponding to the position on the progress bar. In other embodiments, the second position may represent the end of a swipe gesture beginning at the first position. The media guidance application may adjust playback of the media asset a certain amount based on the distance between the first position and the second position (that is, the length of the swipe). In some embodiments, the media guidance application may adjust playback of the media asset a predetermined amount regardless of the length of the swipe gesture. Thus, the media guidance application may utilize the second position to adjust playback, which was detected and stored based on movement of the user input, rather than the third position, which was detected based on removing the contact from the touch screen. In this manner, the media guidance may ignore jitter associated with removing contact from the touch screen when controlling playback of the media asset.

FIG. 8 depicts illustrative pseudocode 800 for adjusting playback of a media asset in accordance with some embodiments of the disclosure. It will be evident to one skilled in the art that the process described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, control circuitry 504 runs a subroutine to initialize variables and prepare to control playback of a media asset, which begins on line 805. For example, in some embodiments control circuitry 504 may copy instructions from non-transitory storage medium (e.g., storage 508) into RAM or into the cache for processing circuitry 506 during the initialization stage.

At line 805, control circuitry 504 detects a first transition event of contact on a touch screen. As discussed above, the transition event may comprise a swipe gesture by a user on the touch screen. At line 806, the control circuitry 504 retrieves a timestamp associated with contact at a first position (for example the start position of the swipe) and stores it in the temporary variable "t1." At line 807, the control circuitry 504 retrieves a timestamp associated with contact at a second position (for example, a position where the swipe pauses on the touch screen) and stores it in the temporary variable "t2." At line 808, control circuitry 504 retrieves a time duration of the contact at a second position and stores it in the temporary variable "t3." In some embodiments these instances may be retrieved from memory, such as local storage 508 (FIG. 5) or media guidance data source 618 (FIG. 6). In some embodiments, control circuitry 504 may receive instances of the timestamps by receiving, for example, a pointer to an array of timestamps. In another example, control circuitry 504 may receive an object of a class, such as an iterator object containing the timestamps.

At line 809, the control circuitry 504 may determine whether the contact has paused at the second position for a threshold number of time. For example, the control circuitry 504 may calculate a difference of t3 and t2 and compare it to a predetermined threshold T_threshold to determine whether the time duration is greater than the threshold time. If the time duration is greater than the time threshold, then the control circuitry 504 stores an indication of the second position to memory (e.g., storage 508) in the temporary variable "A" at line 810.

At line 811, the control circuitry 504 may detect a second transition event of contact on the touch screen. For example, after detecting a pause at the second position, the control circuitry 504 may detect a second movement to a third position on the touch screen. At line 812, the control circuitry 504 may detect an end event, wherein contact is removed from the touch screen. The end event may include at least an indication of a position and/or a timestamp associated with a point of final contact with the touch screen.

At line 813, the control circuitry 504 may retrieve the indication of the second position stored in temporary variable "A" from memory (e.g., storage 508). At line 814, the control circuitry 504 may execute a subroutine to adjust playback of the media asset based on A. As described above, for example in relation to step 716 of FIG. 7, the playback of the media asset may be controlled in a number of ways based on the second position.

At line 816, control circuitry 504 runs a termination subroutine after the algorithm has performed its function. For example, in some embodiments control circuitry 504 may destruct variables, perform garbage collection, free memory or clear the cache of processing circuitry 506.

It will be evident to one skilled in the art that process 800 described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed throughout to speed operation, or the conditional statements may be replaced with a case-switch. In some embodiments, rather than iterating over all instances of a variable, in some embodiments the code may be rewritten so control circuitry 504 is instructed to evaluate multiple instances simultaneously on a plurality of processors or processor threads, lowering the number of iterations needed and potentially speeding up computation time.

FIG. 9 is a flowchart 900 of illustrative steps for reducing jitter of a touch screen input in accordance with some embodiments of the disclosure. It should be noted that process 900, or any step thereof, could occur on, or be provided by, any of the devices shown in FIGS. 5-6. For example, process 900 may be executed by control circuitry 504 (FIG. 5) as instructed by the media guidance application (e.g., as implemented on any of the devices shown and described in FIG. 6).

At step 902, the media guidance application may generate for display (e.g., using control circuitry 504) a media asset for playback and a progress bar associated with the media asset. For example, as depicted in the illustrative examples in FIGS. 1 and 2, the progress bar may represent a duration of the media asset and include indicators that show an amount of the duration that has currently been consumed. The progress bar may be oriented in any suitable manner, as will be appreciated by those of skill in the art. For example, the progress bar may be oriented as a horizontal bar that is aligned with a bottom edge of a generated window or display.

At step 904, the media guidance application may receive (e.g., using control circuitry 504), a first indication of contact on a touch screen at a first position, the first indication including at least a set of position coordinates corresponding to the first position. For example, the first indication of contact may represent a point where the finger 110 depicted in FIG. 1 first contacted the screen 102. In some embodiments, the touch screen, touch screen interface, and/or touch screen API may be configured to generate start, transition, and end events in response to detecting first contact, movement of the contact, and removing contact from the screen, respectively. In some embodiments, the touch screen, touch screen interface, and/or touch screen API may be configured to provide constant and/or periodic value updates, such as current position and/or a timestamp of the contact. The media guidance application may receive a start touch event generated in response to detecting contact on the touch screen and/or indications of value updates. The position coordinates may be any suitable data for representing the first position on the touch screen. For example, the position coordinates may be x/y coordinates represented in appropriate units (e.g., pixels, inches, cm, etc.) or polar coordinates (magnitude and angle/direction) from an origin point on the touch screen.

At step 906, subsequent to receiving the first indication, the media guidance application may receive (e.g., using control circuitry 504) a second indication of contact on the touch screen at a second position that is different than the first position, the second indication including at least a set of position coordinates corresponding to the second position. For example, the second position may represent the end point of a movement of the contact from the first position to the second position (e.g., a swipe gesture of the finger 110 across screen 102 in FIG. 2). The position coordinates for the second position may be substantially similar to the position coordinates for the first position described above in relation to step 904.

At step 908, the media guidance application may calculate (e.g., using control circuitry 504), based on the position coordinates corresponding to the first position and the position coordinates corresponding to the second position, a direction of movement from the first position to the second position. The direction of movement may comprise both a direction and a magnitude. For example, the direction of movement may comprise a line of a certain magnitude that connects the first position and the second position on the screen. Persons of skill in the art will recognize several options and algorithms for calculating the magnitude and direction of the direction of movement. For example, in embodiments where the position coordinates are represented as x/y coordinates, the control circuitry 504 may calculate the magnitude of the direction of movement using the Pythagorean theorem. An example calculation is discussed with respect to the pseudocode of FIG. 10. The direction of the direction of movement may be represented, for example, as an angle from horizontal. This direction may be calculated using trigonometric functions and the data from the position coordinates. For example, in some embodiments, the angle may be determined by taking the arccosine of the difference of the x coordinates divided by the magnitude of the direction of movement. An example calculation is discussed with respect to the pseudocode of FIG. 10.

At step 910, the media guidance application may detect (e.g., using control circuitry 504) an orientation of the progress bar on the generated display. For example, the orientation of the progress bar may be represented as a direction or angle from horizontal. In some embodiments, the progress bar may be horizontal and aligned with a bottom edge of a window, display, and/or screen. In such cases, the orientation of the progress bar may be represented as an angle of 0 degrees. The orientation of the progress bar may be calculated in advance and stored to memory, such as storage 508. Furthermore, the orientation of the progress bar need only be calculated and stored was and need not be calculated every time a touch input is received.

At step 912, the media guidance application may separate the calculated direction of movement into a component that is parallel to the orientation of the progress bar and a component that is perpendicular to the orientation of the progress bar. For example, in embodiments where the orientation of the progress bar is horizontal, the parallel component of the direction of movement may be the difference of the x-coordinates, and the perpendicular component of the direction of movement may be the difference of the y-coordinates. A similar calculation can be generalized for any orientation of the progress bar for any angle from the horizontal. For example, in embodiments where the progress bar is tilted at an angle $\theta$ from the horizontal, the parallel and perpendicular components may be calculated by constructing a right triangle with an angle $\theta$ and a hypotenuse set as the direction of movement. Assuming that such a triangle has a side A and a side B, then the Pythagorean theorem sets $A^2+B^2=$(magnitude of the direction of movement)$^2$. In addition, trigonometry may be used to provide a second equation that relates A, B, and $\theta$. For example, $\tan(\theta)=B/A$. Solving this system of two equations for A and B will generate the parallel component A and perpendicular component B.

At step 914, the media guidance application (e.g., using control circuitry 504), may control playback of the media asset to a position in the media asset based on the component of the direction of movement that is parallel to the orientation of the progress bar. As described herein, the media guidance application may control playback of the media based on the parallel component in any suitable manner. In some embodiments, the media guidance application may ignore the perpendicular component when controlling playback, assuming that the perpendicular component is jitter or otherwise unintended touch input. In some embodiments, the media guidance application may control playback based on a magnitude of the parallel component. For example, longer swipe gestures may result in a fast forward/rewind operation of larger durations of time. In some embodiments, the media guidance application may control playback a predetermined amount of time regardless of the magnitude of the input. For example, a forward swipe may result in a fast forward operation of 10 seconds, regardless of the length of the swipe.

In some embodiments, the media guidance application may control playback by ignoring both the parallel and perpendicular component and maintaining current playback or pause point. For example, if a perpendicular component is greater than a threshold value, or greater than the parallel component by a threshold amount, then the touch input may not have been intended to control playback of the media asset. In these cases, the media guidance application may not perform a fast forward or rewind operation in response to the touch input. In some embodiments, the media guidance application may determine whether a time duration of the input is less than a threshold period of time. For example, the threshold period of time may be set such that any touch input that is less than the threshold period of time could not have been physically generated by a human being. In some embodiments, the threshold period of time may be set to some larger period of time, such as 0.5 s, so that any touch inputs must be held or exceed this threshold period of time before the media guidance application will register the touch input.

Although the method of FIG. 9 is described in relation to embodiments that display a progress bar, it will be understood that some media guidance applications may not include a progress bar in conjunction with playback of the media asset. The method of FIG. 9 may still be utilized in systems without a progress bar. For example, instead of comparing the direction of movement to the orientation of a progress bar in steps 910-914, the direction of movement may be compared to any other suitable edge or direction, such as the horizontal or vertical direction or an edge of a window, screen, or display.

FIG. 10 depicts illustrative pseudocode 1000 for reducing jitter of a touch screen input in accordance with some embodiments of the disclosure. It will be evident to one skilled in the art that the process described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 1001, control circuitry 504 runs a subroutine to initialize variables and prepares to reduce jitter of a touch input, which begins on line 1005. For example, in some embodiments control circuitry 504 may copy instructions from non-transitory storage medium (e.g., storage 508) into RAM or into the cache for processing circuitry 506 during the initialization stage.

At line 1005, the control circuitry 504 receives an indication of contact at a first position and stores the position coordinates in the temporary variables "x1" and "y1." At line 1006, the control circuitry 504 receives an indication of contact at a second position and stores the position coordinates in the temporary variables "x2" and "y2." In some embodiments these instances may be retrieved from memory, such as local storage 508 (FIG. 5) or media guidance data source 618 (FIG. 6). In some embodiments, control circuitry 504 may receive instances of the positions by receiving, for example, a pointer to an array of position coordinates. In another example, control circuitry 504 may receive an object of a class, such as an iterator object containing the position coordinates.

At lines 1008-1010, the control circuitry 504 may calculate a magnitude and direction of movement. The equation depicted on line 1009 is based on the Pythagorean theorem and may be used to determine a magnitude of the direction of movement, stored to the temporary variable "magnitude1." The equation depicted on line 1010 is a trigonometric function usable to determine the angle of the direction of movement compared to a horizontal, stored to the temporary variable "angle1."

At lines 1012-1015, the control circuitry 504 may calculate the orientation of the progress bar. As discussed above, these lines may be performed only once and the orientation of the progress bar stored to memory (such as storage 508), or not at all in the case where the orientation of the progress bar is already known or set. At line 1013, the control circuitry 504 retrieves the start position coordinates of a progress bar and stores them in the temporary variables "x3" and "y3." At line 1014, the control circuitry 504 retrieves the end position coordinates of a progress bar and stores them in the temporary variables "x4" and "y4." The equation depicted on line 1015 is a trigonometric function usable to determine the angle of the progress bar compared to a horizontal, stored to the temporary variable "angle2."

At lines 1017-1019, the control circuitry 504 calculates the components of the direction of movement that are parallel and perpendicular to the progress bar. At lines 1018, the control circuitry 504 multiplies the magnitude of the direction of movement by the cosine of angle2 and stores the result in the temporary variable "X," representing the parallel component. At lines 1019, the control circuitry 504 multiplies the magnitude of the direction of movement by the sine of angle2 and stores the result in the temporary variable "Y," representing the perpendicular component.

At line 1021, the control circuitry 504 may execute a subroutine to control playback of the media asset based on the parallel component X. For example, as discussed above in relation to step 914 of FIG. 9, the playback of the media asset may be controlled in any number of ways based on the parallel component.

At line 1023, control circuitry 504 runs a termination subroutine after the algorithm has performed its function. For example, in some embodiments control circuitry 504 may destruct variables, perform garbage collection, free memory or clear the cache of processing circuitry 506.

It will be evident to one skilled in the art that process 1000 described by the pseudocode in FIG. 10 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed throughout to speed operation, or the conditional statements may be replaced with a case-switch. In some embodiments, rather than iterating over all instances of a variable, in some embodiments the code may be rewritten so control circuitry 504 is instructed to evaluate multiple instances simultaneously on a plurality of processors or processor threads, lowering the number of iterations needed and potentially speeding up computation time.

Figure 11:
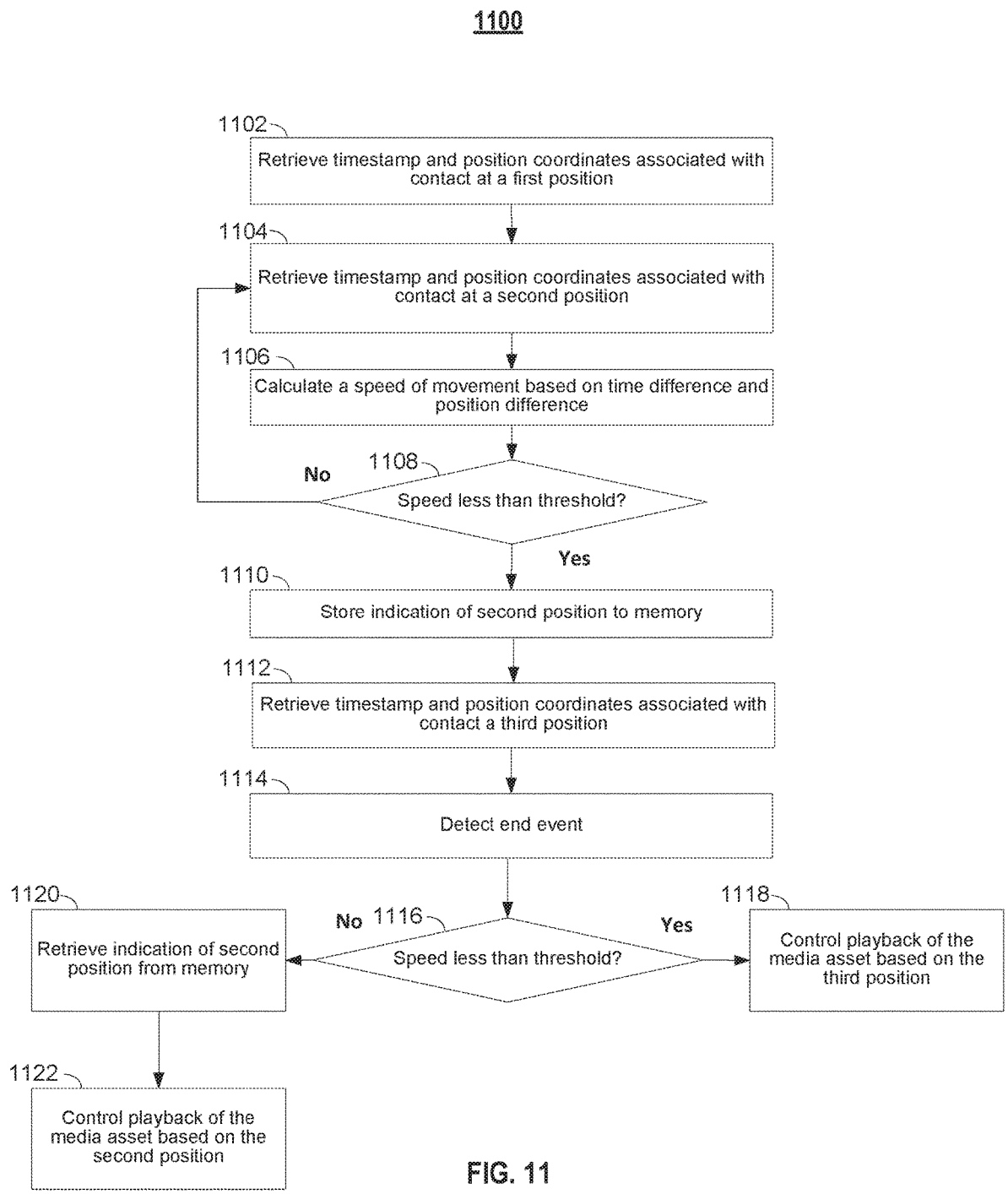
FIG. 11 is a flowchart of illustrative steps for controlling playback of a media asset in accordance with some embodiments of the disclosure.

FIG. 11 is a flowchart 1100 of illustrative steps for controlling playback of a media asset in accordance with some embodiments of the disclosure. It should be noted that process 1100, or any step thereof, could occur on, or be provided by, any of the devices shown in FIGS. 5-6. For example, process 1100 may be executed by control circuitry 504 (FIG. 5) as instructed by the media guidance application (e.g., as implemented on any of the devices shown and described in FIG. 6).

At step 1102, the media guidance application may retrieve (e.g., using control circuitry 504), timestamp and position coordinates associated with contact at a first position. The timestamp and position coordinates may be indicated in any suitable manner and in any suitable units, such as seconds, minutes, hours, or any combination of the above for the timestamp, and x/y coordinates or polar coordinates for the position coordinates. At 1104, the media guidance application may retrieve (e.g., using control circuitry 504) timestamp and position coordinates associated with contact at a second position in much the same way as the contact at the first position. In some embodiments, the contact on the touch screen may not have been removed between the first and the second position (such as in the case of a swipe gesture). In other embodiments, the contact on the touch screen may have been removed between the first and the second position (such as in the case of two separate taps).

At step 1106, the media guidance application may determine (e.g., using control circuitry 504), a speed of movement based on time difference and position difference. Although step 1106 and other steps of flowchart 1100 are described in relation to a speed of the movement (that is, a rate of change or first derivative of the position coordinates), it will be understood that equivalent steps and analysis may be performed based on an acceleration of the movement (that is, a rate of change of speed or second derivative of the position coordinates). As an illustrative example, the media guidance application may calculate the speed of movement by calculating a distance between the first position and the second position and dividing the distance by the time difference of the timestamps retrieved in steps 1102 and 1104. In this manner, the media guidance application calculates a speed in terms of distance traveled by the touch input per unit time.

At step 1108, the media guidance application may determine (e.g., using control circuitry 504) whether the speed of movement is less than a threshold speed. If the speed of movement is too great, then the touch input may not have been intended by the user and be the result of jitter or other unintentional inputs. In such cases, the media guidance application may return to step 1104 and wait for further touch inputs to analyze. If the speed is less than the threshold, which may be indicative of an intentional touch input, then the media guidance application may continue to step 1110.

At step 1110, the media guidance application may store an indication of the second position to memory (e.g., storage 508). At step 1112, the media guidance application may detect (e.g., using control circuitry 504) further movement and retrieve timestamp and position coordinates associated with contact at a third position. Step 1112 may be substantially similar to steps 1102 and 1104. At step 1114, the media guidance application may detect (e.g., using control circuitry 504) an end event received in response to detecting the contact being removed from the touch screen.

At step 1116, the media guidance application may determine whether a speed of movement to the third position is less than a threshold speed. Step 1116 may be substantially similar to step 1108. However, in some embodiments, the movement from the first position to the second position may be an intentional user input (such as a swipe gesture), while the movement from the second position to the third position may be unintentional jitter. In some embodiments, the movement from the second position to the third position may also be an intentional user input. If the speed of movement to the third position is less than the threshold speed, the media guidance application may determine that the movement to the third position was an intentional input, and may thus control playback of the media asset based on the third position at step 1118. If the speed of movement to the third position is greater than the threshold speed (indicating an unintentional user input), then the media guidance application may proceed to retrieve an indication of the second position from memory at step 1120 and control playback of the media asset based on the second position at step 1122. Steps 1120 and 1122 may be substantially similar to steps 714 and 716 depicted in FIG. 7. In this manner, the media guidance application may utilize a speed and/or acceleration of user touch inputs to distinguish between intentional touch inputs and unintentional jitter, and control playback of the media asset based on different position coordinates according to the determination.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for controlling playback of a media asset, the method comprising:
    detecting contact on a touch screen at a first position on a progress bar of the media asset;
    detecting a first transition event of the contact from the first position to a second position on the progress bar, wherein the contact is not removed from the touch screen during the first transition event;
    detecting, subsequent to the first transition event, the contact at the second position for a period of time;
    detecting, subsequent to the first transition event, a second transition event of the contact from the second position to a third position on the touch screen;
    detecting, subsequent to the second transition event, an end event wherein the contact is removed from the touch screen at the third position;
    identifying a perpendicular component of movement associated with the second transition event that is perpendicular to the progress bar;
    determining a speed of movement associated with the perpendicular component of movement;
    determining whether the speed of movement associated with the perpendicular component of movement is greater than a threshold speed; and
    in response to determining that the speed of movement associated with the perpendicular component of movement is greater than the threshold speed, adjusting playback of the media asset to a position in the media asset corresponding to the second position.

2. The method of claim 1, wherein the first transition event comprises a swipe gesture on the progress bar of the media asset.

3. The method of claim 1, wherein the second transition event comprises jitter from the second position to the third position while removing the contact from touch screen.

4. The method of claim 1, further comprising, in response to detecting the contact on the touch screen at the first position, generating for display an image of the media asset corresponding to the first position on the progress bar.

5. The method of claim 1, wherein adjusting playback of the media asset to the position in the media asset corresponding to the second position comprises determining a time stamp associated with the second position on the touch screen.

6. The method of claim 1, wherein adjusting playback of the media asset to the position in the media asset corresponding to the second position comprises adjusting playback of the media asset by a certain amount based on a length of the first transition event.

7. The method of claim 1, further comprising generating for display an indication of at least one of a time stamp or a frame number associated with the first position.

8. The method of claim 1, wherein detecting the contact on the touch screen comprises detecting the contact on the touch screen for a threshold amount of time.

9. The method of claim 1, wherein detecting the first transition event comprises detecting the first transition event within a portion of the progress bar, and wherein adjusting the playback comprises adjusting the playback a predetermined amount that is associated with the portion of the progress bar.

10. The method of claim 1, further comprising:
    comparing the second position and the third position; and
    determining that the third position is different than the second position;
    wherein adjusting playback of the media asset is performed in response to determining that the third position is different than the second position.

11. The method of claim 1, wherein the speed of movement associated with the second transition event equals a rate of change from the second position to the third position.

12. A system for controlling playback of a media asset, the system comprising:
    control circuitry configured to:
        detect contact on a touch screen at a first position on a progress bar of the media asset;
        detect a first transition event of the contact from the first position to a second position on the progress bar, wherein the contact is not removed from the touch screen during the first transition event;
        detect, subsequent to the first transition event, the contact at the second position for a period of time;
        detect, subsequent to the first transition event, a second transition event of the contact from the second position to a third position on the touch screen;
        detect, subsequent to the second transition event, an end event wherein the contact is removed from the touch screen at the third position;
        identify a perpendicular component of movement associated with the second transition event that is perpendicular to the progress bar;
        determine a speed of movement associated with the perpendicular component of movement;
        determine whether the speed of movement associated with the perpendicular component of movement is greater than a threshold speed; and
        in response to determining that the speed of movement associated with the perpendicular component of movement is greater than the threshold speed, adjust playback of the media asset to a position in the media asset corresponding to the second position.

13. The system of claim 12, wherein the first transition event comprises a swipe gesture on the progress bar of the media asset.

14. The system of claim 12, wherein the second transition event comprises jitter from the second position to the third position while removing the contact from touch screen.

15. The system of claim 12, wherein the control circuitry is further configured to, in response to detecting the contact on the touch screen at the first position, generate for display an image of the media asset corresponding to the first position on the progress bar.

16. The system of claim 12, wherein the control circuitry is configured to adjust playback of the media asset to the position in the media asset corresponding to the second position by determining a time stamp associated with the second position on the touch screen.

17. The system of claim 12, wherein the control circuitry is configured to adjust playback of the media asset to the position in the media asset corresponding to the second position by adjusting playback of the media asset by a certain amount based on a length of the first transition event.

18. The system of claim 12, wherein the control circuitry is further configured to generate for display an indication of at least one of a time stamp or a frame number associated with the first position.

19. The system of claim 12, wherein the control circuitry is configured to detect the contact on the touch screen by detecting the contact on the touch screen for a threshold amount of time.

20. The system of claim 12, wherein the control circuitry is configured to detect the first transition event by detecting the first transition event within a portion of the progress bar, and wherein the control circuitry is configured to adjust the playback by adjusting the playback a predetermined amount that is associated with the portion of the progress bar.

21. The system of claim 12, wherein the control circuitry is further configured to:
   compare the second position and the third position; and
   determine that the third position is different than the second position;
   wherein the control circuitry is configured to adjust playback of the media asset in response to determining that the third position is different than the second position.

22. The system of claim 12, wherein the speed of movement associated with the second transition event equals a rate of change from the second position to the third position.

* * * * *